(12) United States Patent
Casillas

(10) Patent No.: US 6,959,768 B1
(45) Date of Patent: Nov. 1, 2005

(54) WEED PLUCKER

(76) Inventor: Luis E. Casillas, P.O. Box 169, Morovis, PR (US) 00687

( * ) Notice: Subject to any disclaimer, the term of this patent is extended or adjusted under 35 U.S.C. 154(b) by 30 days.

(21) Appl. No.: 10/921,239

(22) Filed: Aug. 18, 2004

Related U.S. Application Data

(60) Provisional application No. 60/496,281, filed on Aug. 19, 2003.

(51) Int. Cl.[7] .......................... A01B 33/00; B66F 3/00
(52) U.S. Cl. ...................... 172/378; 254/132; 294/50.8
(58) Field of Search ........ 172/371–378; 111/106–108; 294/50.8, 50.9, 55.5; 254/132, 131, 131.5, 254/120

(56) References Cited

U.S. PATENT DOCUMENTS

| | | | | |
|---|---|---|---|---|
| 3,976,282 A | * | 8/1976 | Baker | .......................... 254/132 |
| 4,673,165 A | * | 6/1987 | Nelson et al. | .............. 254/132 |
| 4,815,778 A | * | 3/1989 | Hoch | ......................... 294/55.5 |
| 4,832,132 A | * | 5/1989 | Barcelon | ..................... 172/371 |
| 5,609,325 A | * | 3/1997 | DeArmond | ................. 254/132 |
| 5,857,529 A | * | 1/1999 | Nguyen | ...................... 172/378 |
| 6,290,211 B1 | * | 9/2001 | Pheiffer | ...................... 254/132 |

* cited by examiner

*Primary Examiner*—Robert E. Pezzuto
(74) *Attorney, Agent, or Firm*—Hoglund & Pamias; Heath W. Hoglund

(57) ABSTRACT

A weed puller includes a handle, a pair of tines extending from the bottom of the handle, and a step extending back from the handle. The tines are pushed into the ground near a weed by pressing down (by foot) on the step. The handle is then pulled back. This causes the tines to pivot and lift the weed (and its root structure) out of the ground. The pivot occurs about the outer-most end of the step. The step is wider than the pair of tines so that the downward pressure on the step is distributed about a relatively large surface area. Thus, the entire step remains above ground, without breaking the ground below the step, to minimize the portion of the ground that is broken by removal of the weed.

8 Claims, 3 Drawing Sheets

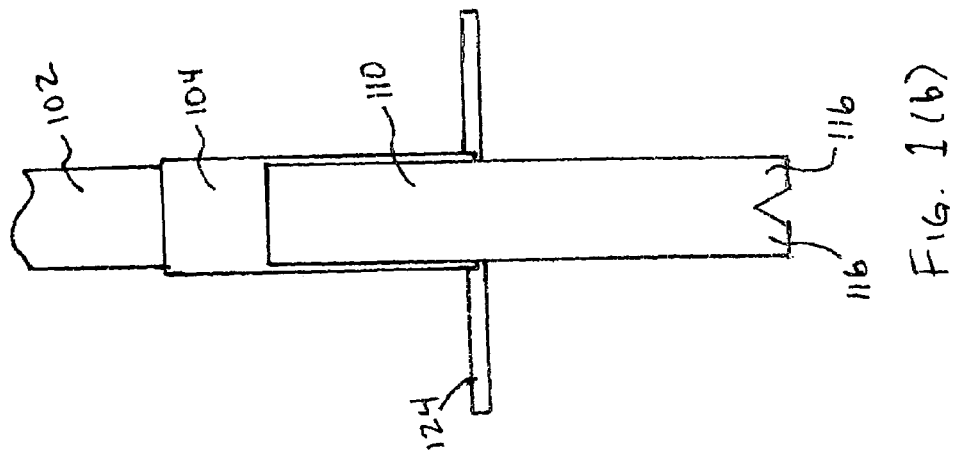
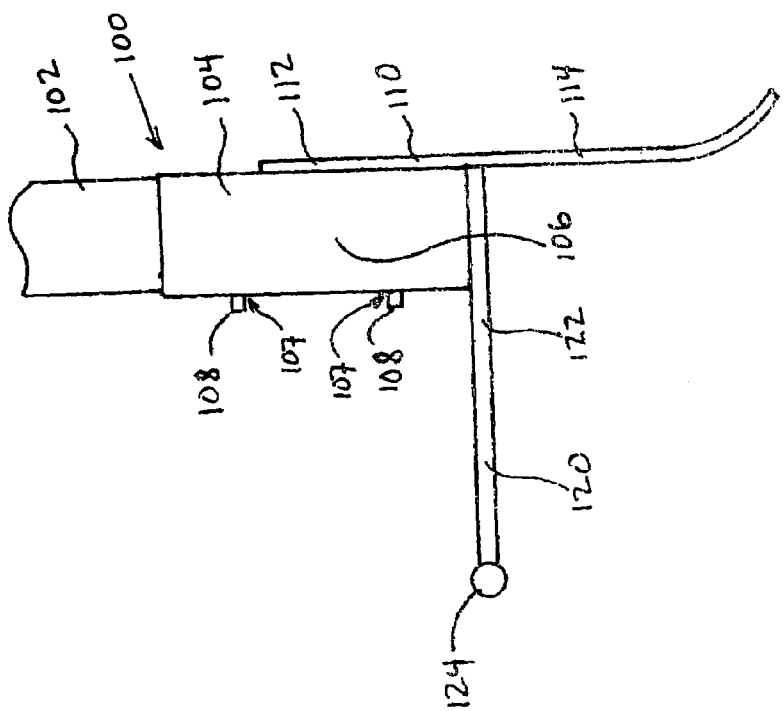

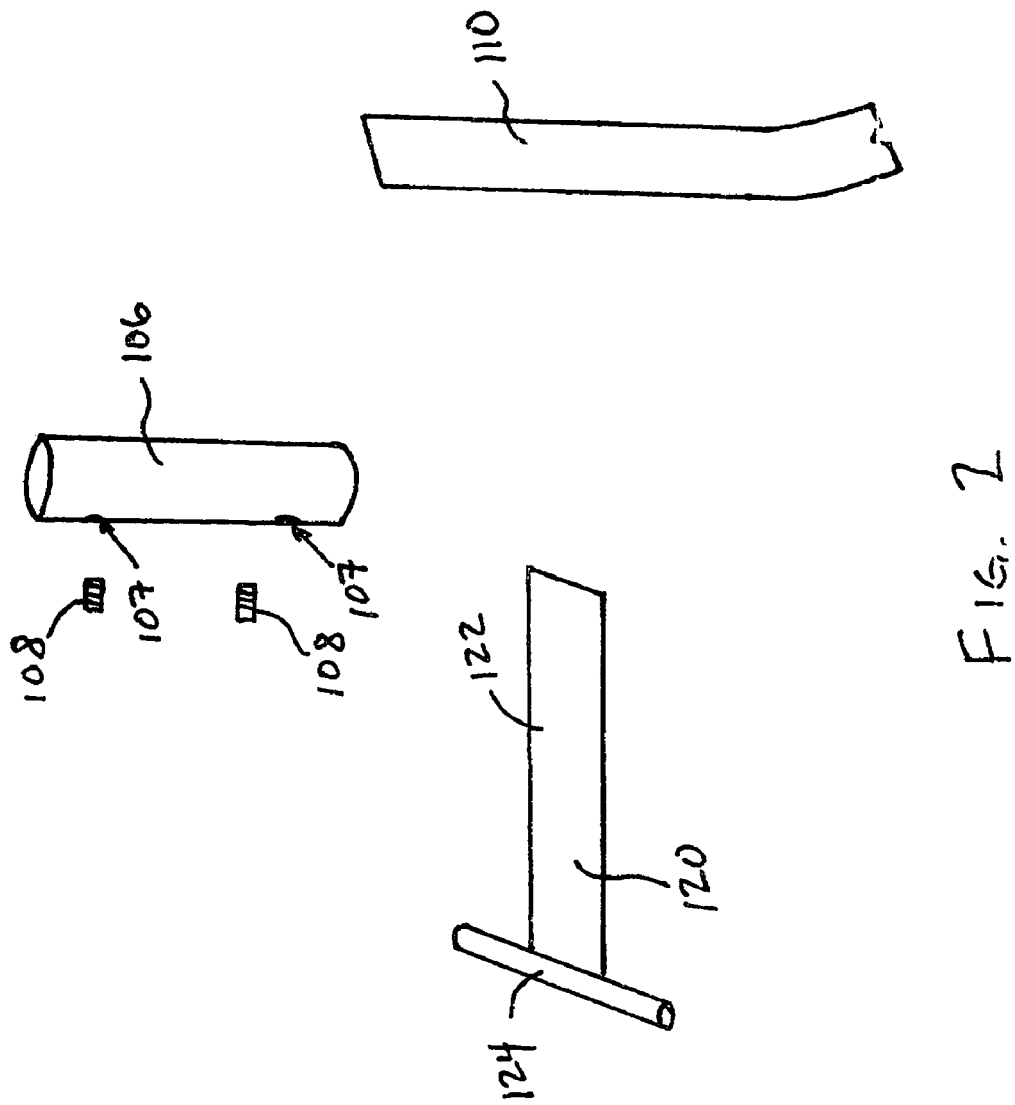

WEED PLUCKER

PRIORITY

This application claims the benefit of priority to U.S. Provisional Patent Application No. 60/496,281, filed Aug. 19, 2003.

FIELD OF THE INVENTION

The invention relates to a device and method for extracting a plant, such as a weed, from the ground.

BACKGROUND OF THE INVENTION

Unwanted plants such as weeds have a tendency to grow very quickly on grass lawns, flowerbeds and the like. Typically, such weeds are cut at their stems by lawnmowers or manual cutters. This does not damage the root system of the weed and the weeds can therefore grow back very quickly from their already established root system. Spades and other hand-held instruments have been used in the past in an attempt to dig out the root system of the weeds but these methods have not been found to effectively remove the root system and moreover have been found to be cumbersome and time consuming.

A variety of specialized weed-extracting tools have been disclosed in the prior art, which are better designed for the task. For example, U.S. Pat. No. 5,490,374, issued Oct. 20, 1994 to Calande, and titled "Plant Puller," teaches a specialized hook for pulling a group of weeds out of the ground. The hook is placed around the stem of the weeds. As the tool is pulled, the weeds are first compressed into a narrow portion of the hook so that they are firmly griped. As the tool is pulled further, the weeds are pulled from the ground. In loose or soft soil, the root system of the weeds will be removed along with the stems. However, in compressed and hard soil, the stems will tend to break from the roots. This, unfortunately, permits the weeds to quickly grow back from the established root system.

For another example, U.S. Pat. No. 3,767,251, issued Oct. 23, 1973, to San Filipo, and titled "Weed Extracting Device," teaches a relatively-complex, spring-loaded mechanism for removing weeds along with their subterranean root systems. Specifically, it teaches a pair of tines pivotally attached at the bottom of a handle. The tines are pressed into the ground adjacent the subterranean root system of a weed. The tines are rotated from a substantially vertical to a substantially horizontal position through a spring-loaded mechanism connected through the body of the handle. By this rotation, the tines lift the root system out of the ground. This likewise works well in loose and soft soil. In compressed and hard soil, however, the mechanism is difficult to operate because the spring-loaded mechanism does not have the full mechanical advantage of the handle. Of course, the handle of this device can be rotated to lift the tines out of the soil. In this mode of operation, as the handle is pulled at its top end, the tines are rotated to lift the root system from the ground. Mechanically, the tines pivot about an intermediate point along a foot pedal which extends from the base of the handle. Since the intermediate pivot point is near to the tines, the handle must be pulled through a large arc in order to achieve sufficient movement to lift the root system. Although this can satisfactorily remove a weed system, this mode of operation can be difficult to use due to space limitations and because repetitive pulling of the handle through a large arc can become tiring for an operator.

For another example, U.S. Pat. No. 3,847,226, issued Nov. 12, 1974, to Long, and titled "Weeder," teaches a one-piece tool for removing a weed along with its subterranean root system. The tool has a pair of tines, which bend slightly back to provide an intermediate fulcrum and bend back again to form an upper step portion. The tines are pressed into the ground adjacent a weed by stepping upon the step portion of the tool. The tool is bolted to a handle. The tines lift the root system of a weed by pulling the top end of the handle. Mechanically, the tines move in counter-rotation to the handle about the fulcrum portion of the tool. This rotation pulls a divot of soil from the ground that includes the weed structure. Unfortunately, however, this rotation also causes collateral damage to the ground. Specifically, because the fulcrum portion of the tool is pushed below the surface of the ground, it unnecessarily breaks ground behind the weed and subterranean root system. For a finished lawn, breaking ground beyond that which is necessary to remove the weed is obviously undesirable.

Accordingly, because of the limitations in the prior art, a weed puller tool is desired which is easy to operate and does not require repetitive movement of a handle through a large arc. In addition, operation of the tool should minimize any collateral damage to the ground and should break the ground only where necessary to remove the weed's root system.

SUMMARY OF THE INVENTION

According to one aspect of the invention, a weed puller includes a handle, a pair of tines extending from the bottom of the handle, and a step extending back from the handle. The tines are pushed into the ground near a weed by pressing down (by foot) on the step. The handle is then pulled back. This causes the tines to pivot and lift the weed (and its root structure) out of the ground. The pivot occurs about the outer-most end of the step. The step is wider than the pair of tines so that the downward pressure on the step is distributed about a relatively large surface area. Thus, the entire step remains above ground, without breaking the ground below the step, to minimize the portion of the ground that is broken by removal of the weed.

According to another aspect of the invention, a manually-operated weed plucker for removing a weed and its root system includes an elongated handle, a blade and a step. The elongated handle has a top and a bottom end and a substantially linear body. The blade has an upper flat portion and a lower pair of tines for grabbing and lifting the weed and its root system. The upper flat portion of the blade is attached to the bottom end of the elongated handle and is aligned with the substantially linear body of the handle. The lower pair of tines connects with the upper flat portion of the blade about an obtuse angle so that when the handle is held in a vertical orientation the upper flat portion of the blade is held in a vertical orientation and the lower pair of tines is held at an angle thereto.

The step is formed separately from but connected with the blade, having an inner flat portion and an exterior fulcrum member having a center point, wherein the inner flat portion extends from the bottom end of the elongated handle at a substantially right angle thereto and the exterior fulcrum member attaches at the outermost end of the step and is substantially wider than the inner flat portion of the step and substantially wider than the blade so that when the blade is placed on a portion of ground adjacent the weed, pressing down upon the step forces the blade into the ground until the entire step rests upon the ground and so that when the handle is pulled in a backward direction the blade pivots about the center point of the fulcrum member and lifts a portion of the ground including the root system while leaving the portion of the ground below the fulcrum member in tact.

According to further aspects of the invention, the elongated handle is a wooden stick. The blade is formed from a flat bar of metal which is notched at a bottom end to form the pair of tines and is bent to form the obtuse angle between the upper flat portion and the pair of tines. The inner flat portion of the step is formed from a flat bar of metal having an inner and an outer end and the outer fulcrum member is formed from a rod of metal which is substantially wider than the flat bar of metal. The rod of metal is welded to the outer end of the flat bar of metal.

According to a further aspect of the invention, the weed plucker also includes a body formed from a metal pipe having a top end and a bottom end. The blade is welded along a front side of the metal pipe and extends down below the bottom end of the metal pipe. The inner end of the step is welded to the bottom end of the metal pipe. And, the bottom end of the elongated handle fits in the top end of the pipe. The body also defines a pair of threaded holes. A pair of bolts pass through the treaded holes to form a friction fit with the bottom end of the elongated handle.

According to another aspect of the invention, an operator uses the weed plucker to remove a weed and its root system. The blade is placed on a portion of ground adjacent the weed. The operator presses down upon the step to force the blade into the ground until the entire step rests upon the ground. The operator pulls the handle in the backward direction so that the blade pivots about the center point of the fulcrum member and lifts the portion of the ground including the root system while leaving the portion of the ground below the fulcrum member in tact.

According to another aspect of the invention, a tool for pulling a weed and its root system up from below ground includes an elongated handle and a head. The elongated handle has a top end and a bottom end. The head is connected with the bottom end of the handle. The head includes a bar and a step member. The bar extends down from the bottom end of the handle and terminates in a pair of tines which slant in a forward direction. The step member extends horizontally from the bottom end of the handle in a backward direction, opposite the forward direction, and terminates at a rear pivot axis of the head. The step member lies along a substantially horizontal plane. The step member is substantially wider than the bar as it terminates at the rear pivot axis so that when the bar is pushed into the ground adjacent the weed until the step member rests upon the ground and the handle is pulled in the backward direction, the pair of tines arc upward about the rear pivot axis to lift the root system up out of the ground while the step member presses downward upon the ground but without breaking the ground.

BRIEF DESCRIPTION OF THE DRAWINGS

FIG. 1(a) is a side view of one preferred embodiment of the weed plucker 100, including a handle 102 and a head 104.

FIG. 1(b) is a front view of the weed plucker of FIG. 1(a).

FIG. 2 is an exploded, perspective view of the head 104 of FIG. 1(a).

DETAILED DESCRIPTION OF THE INVENTION

Figure 3C:
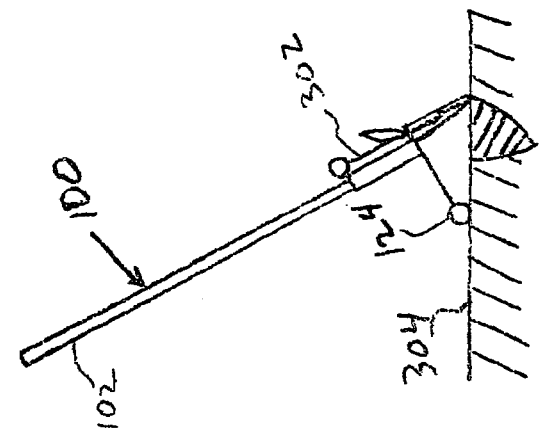
FIG. 3(c) is a side view of the weed plucker of FIG. 1(b) shown as it is rotated to lift the weed and its root structure out of the ground.

Turning to FIGS. 1(a) and (b), one preferred embodiment of the invention is described. The weed plucker 100 includes a handle 102 and a head 104. The handle 102 is preferably constructed from a strong, lightweight material such as a hard wood or aluminum. The handle is preferably approximately four to five feet (4–5') long. The head 104 is preferably constructed of a metal, such as galvanized steel, which is capable of enduring repeated use over a long period of time and resists corrosion.

The head 104 includes a body 106. The body 106 is used to attach the head 104 to the handle 102. The body 106 is tubular. Along a back side of the body 106 it defines a pair of threaded holes 107. One is near the top end and one is near the bottom end of the body 106. Bolts 108 pass through the threaded holes 107. The bolts 108 press against the handle 102 to form a rigid, friction fit between the head 104 and the handle 102.

The head 104 also includes a pry bar 110. The pry bar 110 is the portion of the weed plucker 100 that lifts the weed and its root system out of the ground. The pry bar 110 has an upper portion 112 that consists of a substantially flat blade. This upper portion 112 of the pry bar 110 runs along the length of the body 106 from its bottom end to near its top. The pry bar 110 also has a lower portion 114 that extends below the bottom of the body 106. The lower portion 114 continues from the substantially flat blade of the upper portion 112, then bends to form a pair of tines 116.

Finally, the head 104 includes a step 120, formed of two parts. The step 120 includes a bar 122 that extends horizontally from the bottom end of body 106. The inner end of bar 122 meets pry bar 114. The outer end of bar 122 joins a rod 124. The rod 124 is substantially wider than bar 122 and pry bar 114.

Turning to FIG. 2, the component parts of the head 104 and its construction are further described. Body 106 has an inner diameter of approximately one and one-eight inches (1⅛") and a length of approximately three and one-half inches (3½"). The treaded holes 107 pass approximately one inch (1") from its top and approximately one inch (1") from its bottom.

The pry bar 110 is approximately six and one-half inches (6½") from top to bottom and one inch (1") wide. The pry bar 110 is preferably constructed from a flat bar approximately three-sixteenths inch (3/16") thick by cutting it to length. The bottom end is then bent at approximately one and one-fourth inches (1¼") from its bottom at an approximately forty-five degree (45°) angle; it is also notched to form the pair of tines 116. The upper portion of approximately three inches (3") of pry bar 110 is placed against body 106. It is welded along its top and left and right sides to the body 106.

The step 120 consists of a flat bar 122 that is approximately four inches (4") long and one inch (1") wide. It is preferably constructed from a flat bar approximately one-fourth inch (¼") thick. It is thicker than pry bar 110 because it will experience greater stress and strain in operation. The outermost end of step 120 is a rod 124, approximately four inches (4") long. It is preferably constructed from a one-half inch (½") diameter stock, cut to length. The rod 124 and the flat bar 122 are placed substantially flat on a horizontal surface. The outer end of flat bar 122 is placed against the center of rod 124. The two pieces are welded together along this junction. The other end of the flat bar 122 is positioned against the bottom of body 106 and so that it abuts pry bar 110. It is welded to the body 106 around its diameter. It is also welded to pry bar 110 at their junction.

In an alternative preferred embodiment, the head 104 is cast in a mold rather than constructed by welding together the component pieces. Such casting is better suited to mass production.

Figure 3B:
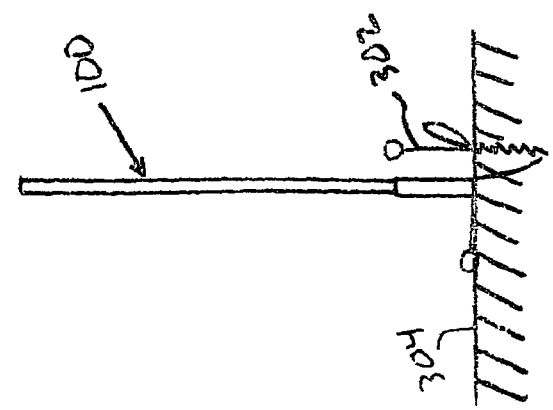
FIG. 3(b) is a side view of the weed plucker of FIG. 1(a) shown as it is pressed into the ground.
Figure 3A:
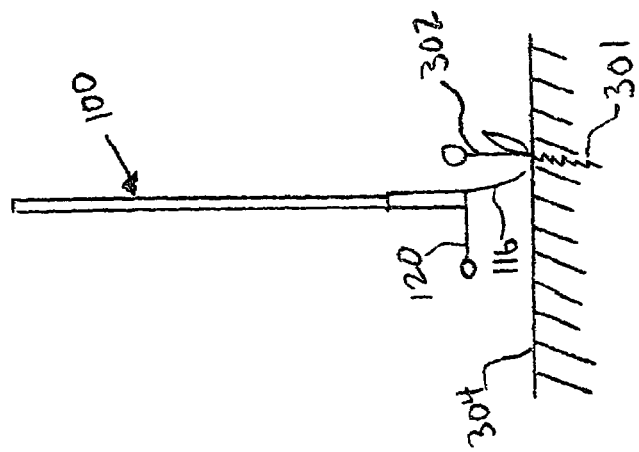
FIG. 3(a) is a side view of the weed plucker of FIG. 1(a) shown as it is placed adjacent a weed with subterranean root structure.

Turning to FIGS. 3(a)–(c), one preferred method of operating the weed puller 100 is described. As shown in FIG. 3(a), the weed puller 100 is placed adjacent a weed 302. The tines 116 rest on the surface of the ground 304. A person presses down (by foot) on step 120, which forces the tines 116 to break the surface of the ground 304. The person continues to press down until the entire portion of the pry bar 110 that extends below the body 106 is below ground and the entire step 120 rests upon the surface of the ground. This is shown in FIG. 3(b). The person then pulls back on handle 102. This causes the step to press down on the surface of the ground 304 and causes pry bar 110 to rotate and lift the weed and its root structure. This rotation occurs about the center of rod 124, which acts as a fulcrum member for the weed plucker. Because the entire surface of step 120 rests upon the surface of the ground, the pressure from pulling backward on the handle 102 is distributed through the entire step 120. Distribution of this pressure prevents step 120 from breaking through the surface of the ground 304. At the same time, pry bar 100 breaks soil and lifts weed 302 and its root system out. As the handle is pulled backward, only the rod portion of the step 120 remains in contact with the ground as the pivot point. However, the ground-breaking pressure is greatest at the initial pull, before the tines have broken the soil. Immediately after the initial pull when the tines break the soil, the pressure on the step is reduced. Thus, this mechanism distributes the initial pressure about the greater surface area of the entire step then after the pressure is reduced only the rod portion of the step 120 remains in contact with the ground. This operates to remove the weed, while at the same time minimizing surface damage to the ground. Thus surrounding grass or foliage is not damaged.

In addition, because the point of rotation for the tines 116 is moved back to the center of rod 124, the arc of movement at the top of the handle 102, which is required to lift the weed 302, is substantially reduced.

Although the subject invention has been described with reference to specific preferred embodiments and methods of use, those skilled in the art will appreciate that many modification and variations are possible without departing from the subject teachings. All such modifications and variations are intended to be encompassed within the scope of the following claims.

I claim:

1. A manually-operated weed plucker for removing a weed and its root system comprising:
   an elongated handle having a top and a bottom end and a substantially linear body;
   a blade having an upper flat portion and a lower pair of tines for grabbing and lifting the weed and its root system, wherein the upper flat portion is attached to the bottom end of the elongated handle and is aligned with the substantially linear body of the handle and the lower pair of tines connects with the upper flat portion about an obtuse angle so that when the handle is held in a vertical orientation the upper flat portion of the blade is held in a vertical orientation and the lower pair of tines is held at an angle thereto;
   a step, formed separately from but connected with the blade, having an inner flat portion and an exterior fulcrum member having a center point, wherein the inner flat portion extends from the bottom end of the elongated handle at a substantially right angle thereto and the exterior fulcrum member attaches at the outermost end of the step and is substantially wider than the inner flat portion of the step and substantially wider than the blade so that when the blade is placed on a portion of ground adjacent the weed, pressing down upon the step forces the blade into the ground until the entire step rests upon the ground and so that when the handle is pulled in a backward direction the blade pivots about the center point of the fulcrum member and lifts a portion of the ground including the root system while leaving the portion of the ground below the fulcrum member in tact.

2. The weed plucker of claim 1, wherein the elongated handle comprises a wooden stick.

3. The weed plucker of claim 1, wherein the blade is formed from a flat bar of metal which is notched at a bottom end to form the pair of tines and which is bent to form the obtuse angle between the upper flat portion and the pair of tines.

4. The weed plucker of claim 3, wherein the inner flat portion of the step is formed from a flat bar of metal having an inner and an outer end and the outer fulcrum member is formed from a rod of metal which is substantially wider than the flat bar of metal and wherein the rod of metal is welded to the outer end of the flat bar of metal.

5. The weed plucker of claim 4, further comprising a body formed from a metal pipe having a top end and a bottom end, wherein the blade is welded along a front side of the metal pipe and wherein the blade extends down below the bottom end of the metal pipe, and wherein the inner end of the step is welded to the bottom end of the metal pipe, and wherein the bottom end of the elongated handle fits in the top end of the pipe.

6. The weed plucker of claim 5, wherein the body defines a pair of threaded holes and wherein the weed plucker further comprises a pair of bolts passing through the treaded holes to form a friction fit with the bottom end of the elongated handle.

7. A method of removing a weed and its root system by providing the weed plucker of claim 1 and placing the blade on a portion of ground adjacent the weed, pressing down upon the step to force the blade into the ground until the entire step rests upon the ground, and pulling the handle in the backward direction so that the blade pivots about the center point of the fulcrum member and lifts the portion of the ground including the root system while leaving the portion of the ground below the fulcrum member in tact.

8. A tool for pulling a weed and its root system up from below ground comprising:
   an elongated handle having a top end and a bottom end; and
   a head connected with the bottom end of the handle, wherein the head includes:
      a bar extending down from the bottom end of the handle and terminating in a pair of tines which slant in a forward direction; and
      a step member extending horizontally from the bottom end of the handle in a backward direction, opposite the forward direction, and terminating at a rear pivot axis of the head, wherein the step member lies along a substantially horizontal plane, and wherein the step member is substantially wider than the bar as it terminates at the rear pivot axis so that when the bar is pushed into the ground adjacent the weed until the step member rests upon the ground and the handle is pulled in the backward direction, the pair of tines arc upward about the rear pivot axis to lift the root system up out of the ground while the step member presses downward upon the ground but without breaking the ground.

* * * * *